United States Patent
Choi et al.

(10) Patent No.: US 8,436,930 B2
(45) Date of Patent: May 7, 2013

(54) APPARATUS AND METHOD FOR CAPTURING AN IMAGE UTILIZING A GUIDE IMAGE AND LIVE VIEW IMAGE CORRESPONDING TO THE GUIDE IMAGE

(75) Inventors: Jae-joon Choi, Suwon-si (KR); Eun-young Kim, Suwon-si (KR); Tae-hoon Kang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 333 days.

(21) Appl. No.: 12/635,844

(22) Filed: Dec. 11, 2009

(65) Prior Publication Data

US 2010/0157128 A1  Jun. 24, 2010

(30) Foreign Application Priority Data

Dec. 24, 2008 (KR) .................. 10-2008-0133783

(51) Int. Cl.
*H04N 5/222* (2006.01)
(52) U.S. Cl.
USPC ........................... 348/333.05; 348/333.11
(58) Field of Classification Search ............ 348/333.01, 348/333.02, 333.03, 333.04, 333.05, 333.11, 348/333.12
See application file for complete search history.

(56) References Cited

U.S. PATENT DOCUMENTS

| 5,477,264 | A* | 12/1995 | Sarbadhikari et al. ..... 348/231.6 |
| 7,057,658 | B1* | 6/2006 | Shioji et al. .............. 348/333.12 |
| 7,424,218 | B2 | 9/2008 | Baudisch et al. |
| 7,518,640 | B2* | 4/2009 | Nakajima et al. .......... 348/231.2 |
| 7,733,388 | B2* | 6/2010 | Asaeda ...................... 348/239 |
| 8,049,766 | B2* | 11/2011 | Fisher et al. ............... 345/593 |
| 8,120,641 | B2 | 2/2012 | Kang et al. |
| 2001/0048802 | A1* | 12/2001 | Nakajima et al. .......... 386/46 |
| 2002/0135672 | A1* | 9/2002 | Sezan et al. ............... 348/36 |
| 2004/0189849 | A1* | 9/2004 | Hofer ....................... 348/333.03 |
| 2005/0024517 | A1* | 2/2005 | Luciano ................... 348/333.03 |
| 2007/0030363 | A1* | 2/2007 | Cheatle et al. ............. 348/239 |
| 2007/0188617 | A1* | 8/2007 | Stavely .................... 348/207.99 |
| 2008/0129842 | A1 | 6/2008 | Shibutani |
| 2009/0015702 | A1* | 1/2009 | Garcia Alonso ......... 348/333.02 |
| 2009/0091635 | A1* | 4/2009 | Fukuyama ................ 348/220.1 |

FOREIGN PATENT DOCUMENTS

| KR | 10-2003-0088351 A | 11/2003 |
| KR | 1020040047876 A | 6/2004 |
| KR | 10-2006-0006186 A | 1/2006 |
| KR | 10-2007-0055721 A | 5/2007 |
| KR | 1020070068086 A | 6/2007 |
| KR | 10-2007-0116410 A | 12/2007 |
| KR | 10-2008-0028973 A | 4/2008 |
| KR | 1020080039639 A | 5/2008 |
| KR | 1020080044132 A | 5/2008 |
| KR | 10-2008-0075954 A | 8/2008 |

* cited by examiner

*Primary Examiner* — Nicholas Giles
(74) *Attorney, Agent, or Firm* — Drinker Biddle & Reath LLP

(57) ABSTRACT

A digital image processing apparatus configured to display a guide image of a previously captured image in a portion of a screen and a live view image in another portion of the screen, and configured to notify a user when the guide image and the live view image match each other. A method of operating a digital image processing apparatus that includes displaying a guide image on a display and trimming a central portion of the guide image; displaying a live view image in a central area of the display where the guide image is not displayed; and capturing the live view image when the guide image and the live view image are matched with each other.

12 Claims, 8 Drawing Sheets

(a)

(b)

(c)

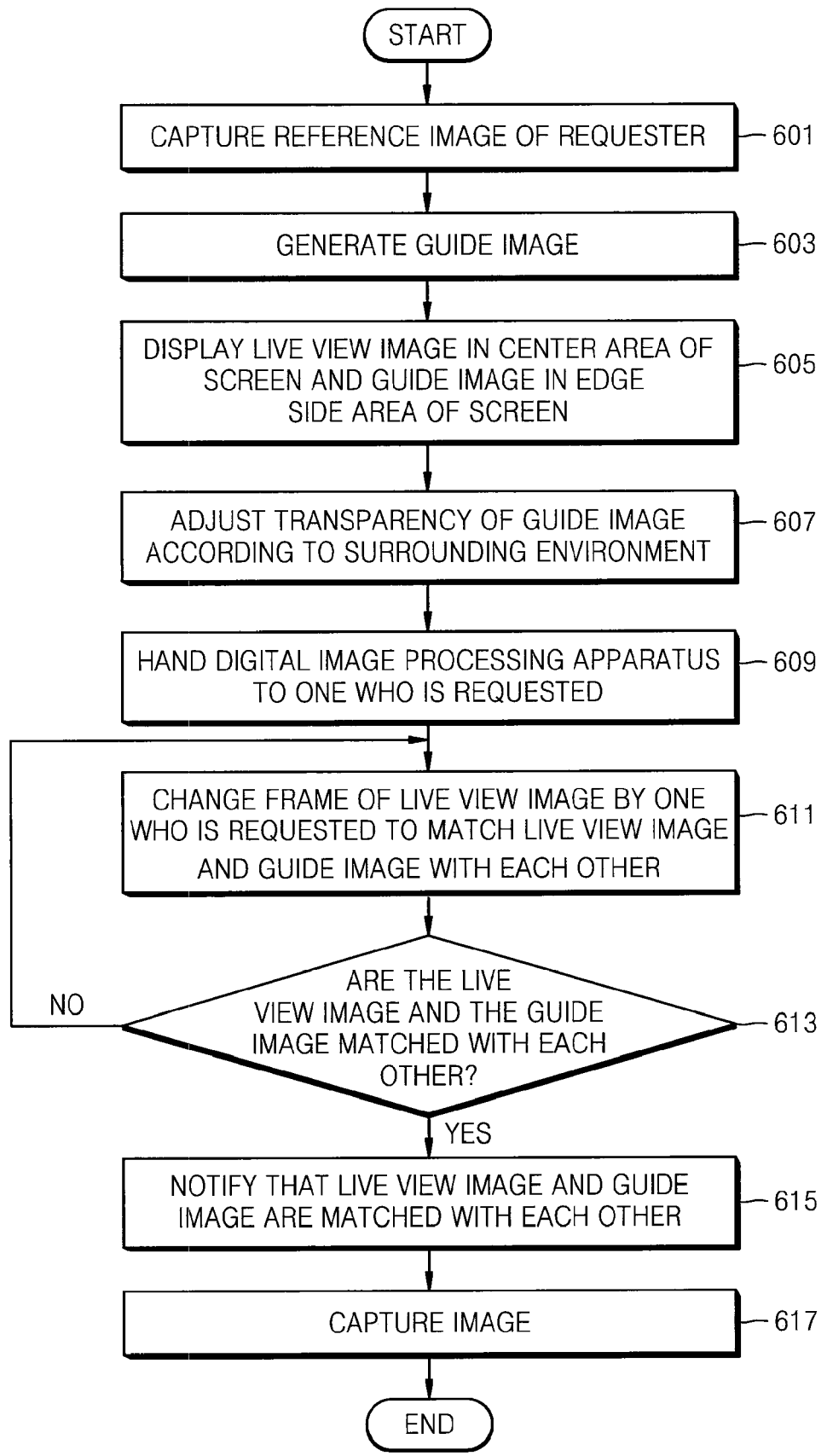

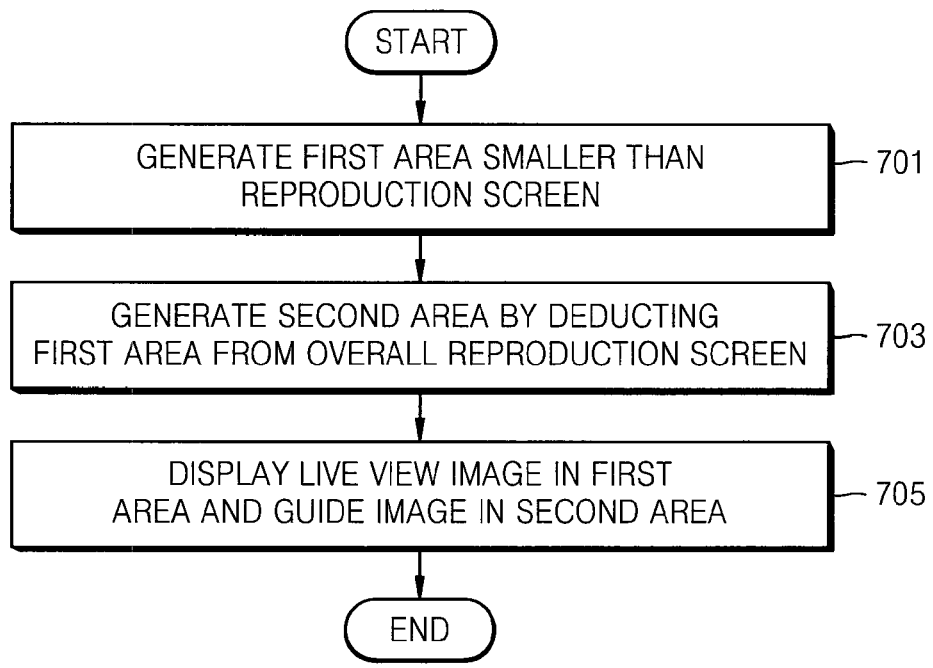
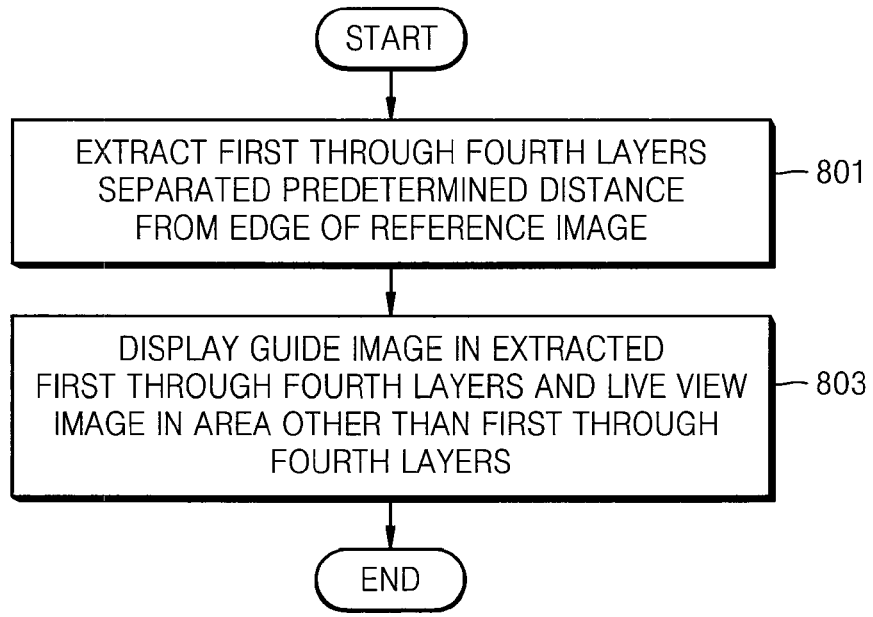

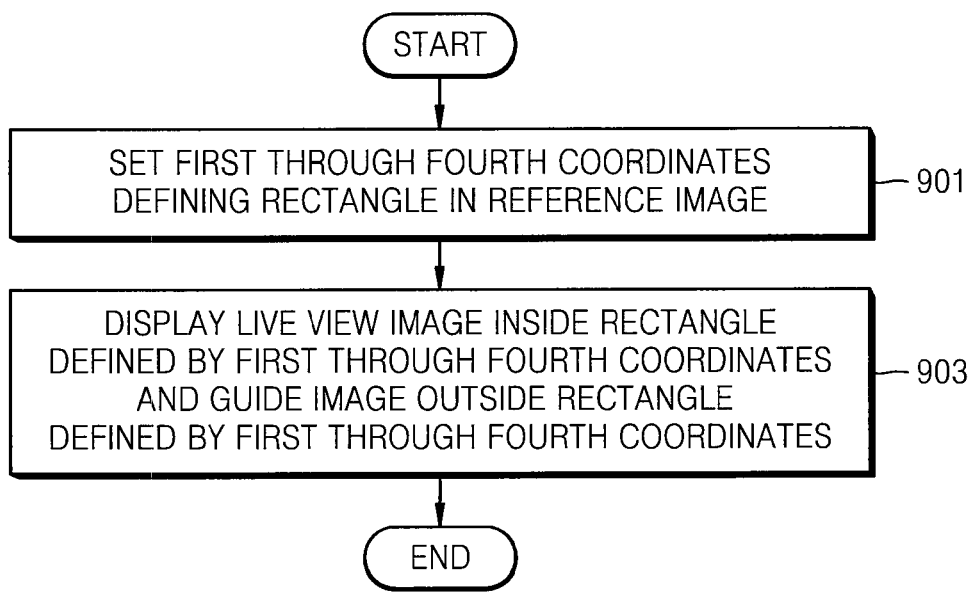

APPARATUS AND METHOD FOR CAPTURING AN IMAGE UTILIZING A GUIDE IMAGE AND LIVE VIEW IMAGE CORRESPONDING TO THE GUIDE IMAGE

CROSS-REFERENCE TO RELATED PATENT APPLICATIONS

This application claims the benefit of Korean Patent Application No. 10-2008-0133783, filed on Dec. 24, 2008 in the Korean Intellectual Property Office, the entire disclosure of which is incorporated herein by reference.

BACKGROUND OF THE INVENTION

1. Field of the Invention

The present invention relates to an apparatus and method for capturing an image by displaying a portion of a previously captured image and a portion of a live view image on the same display so that an image may be captured to match the previously captured image.

2. Description of the Related Art

A user of a digital image processing apparatus may want to take an image of themselves. The user may want to first frame the image without themselves in the image. For example, a user may want to frame an image against a famous background such as a landmark. The user may want a particular framing of the image. For example a particular angle relative to the landmark. The user may then give the digital image processing apparatus to another person to actual take the image of the user.

However, it may be difficult for the other person actually taking the image of the user to frame the image in the same way that the user of the digital image processing apparatus would like. So, the resulting image of the user may not be framed as the user would like.

SUMMARY OF THE INVENTION

A digital image processing apparatus is presented. The digital image processing apparatus including a digital signal processing unit configured to display a guide image of a previously captured image in a portion of a screen and a live view image in another portion of the screen, and a notification unit configured to notify a user when the guide image and the live view image match each other.

The digital signal processing unit may be configured to capture an image when the guide image and the live view image are matched each other.

The digital image processing apparatus may include a guide image generation unit configured to generate the guide image by trimming a central portion of the previously captured image; a display setting unit configured to display the guide image in the portion of the screen and the live view image in the another portion of the screen different from the portion of the screen; a comparison unit configured to compare the guide image and the live view image to determine if the guide image and the live view image are matched with each other; and a control unit configured to control capturing of an image when the guide image and the live view image are matched with each other.

The guide image generation unit may include a first area generation unit configured to generate a first area that is smaller than an overall screen area, and a display setting unit configured to display the guide image in an area of the screen obtained by deducting the first area from the overall screen area and the live view image in the first area.

The digital image processing apparatus may include may include a guide image generation unit comprising a layer extraction unit configured to extract first through fourth layers separated a predetermined distance from an edge of the screen from the guide image, and wherein the display setting unit is configured to display the guide image in the first through fourth layers and the live view image in a portion of the screen different from the first through fourth layers.

The guide image generation unit may include a coordinate setting unit configured to set first through fourth coordinates defining a rectangle of the screen, and the display setting unit configured to display on the screen the guide image outside the rectangle defined by the first through fourth coordinates and the live view image inside the rectangle defined by the first through fourth coordinates.

The control unit may adjust transparency of the guide image based on at least one of photographing conditions and user settings.

A digital image processing apparatus is presented. The digital image processing apparatus may include an area generation unit configured to generate a first area of a display smaller than an overall display area; a display setting unit configured to display a live view image in the first area and to display a guide image that is a previously captured image in an area of the display other than the first area; a notification unit configured to notify a user that the guide image and the live view image are matched with each other, when the guide image and the live view image are matched with each other; and a control unit configured to control capture the live view image after the guide image and the live view image are matched and after receiving an input signal from a user.

The control unit may adjust transparency of the guide image.

A digital image processing apparatus is presented. A digital image processing apparatus may include a layer extraction unit configured to extract first through fourth layers separated a predetermined distance from an edge of a display unit; a display setting unit configured to display a guide image that is a previously captured image in the first through fourth layers and to display a live view image in an area of the display other than the first through fourth layers; a notification unit configured to notify a user that the guide image and the live view image are matched with each other by changing the color of an edge side portion of the live view image or outputting a notification audio signal, when the guide image and the live view image are matched with each other; and a control unit configured to control capturing of the live view image after the notification signal is output.

The control unit adjusts transparency of the guide image.

A digital image processing apparatus is presented. The digital image processing apparatus may include a coordinate setting unit configured to set first through fourth coordinates defining a rectangle in a display unit displaying an image; a display setting unit configured to display a guide image that is a previously captured image outside the rectangle defined by the first through fourth coordinates and a live view image inside the rectangle defined by the first through fourth coordinates; a notification unit configured to notify a user that the guide image and the live view image are matched with each other by changing the color of an edge side portion of the live view image or outputting a notification audio signal, when the guide image and the live view image are matched with each other; and a control unit configured to control capturing of the live view image after the notification signal is output.

The control unit may adjust transparency of the guide image.

A method of operating a digital image processing apparatus is presented. The method may include displaying a guide image on a display and trimming a central portion of the guide image; displaying a live view image in a central area of the display where the guide image is not displayed; and capturing the live view image when the guide image and the live view image are matched with each other.

The method may include notifying a user that the guide image and the live view image are matched with each other by changing the color of an edge side portion of the live view image or outputting a notification audio signal, when the guide image and the live view image are matched with each other.

A transparency of the guide image may be adjusted.

Displaying a guide image may include generating a first area smaller than an overall display area, and displaying the guide image in an area obtained by deleting the first area from the overall display area.

Displaying a guide image may include generating first through fourth layers separated a predetermined distance from an edge of the display, displaying the live image on a portion of the display other than the first through fourth layers, and displaying the guide image in the first through fourth layers.

Displaying a guide image may include generating first through fourth coordinates defining a rectangle area in the display, displaying the guide image outside the rectangle, and displaying the live image inside the rectangle.

BRIEF DESCRIPTION OF THE DRAWINGS

The above and other features and advantages will become more apparent by describing in detail exemplary embodiments thereof with reference to the attached drawings in which:

FIG. 6 is a flow chart for explaining the operation of an example of an image capturing method;

FIG. 7 is a flowchart for explaining an example of the generation of a guide image and the operation of a display method in FIG. 6;

FIG. 8 is a flowchart for explaining an example of the generation of a guide image and the operation of a display method in FIG. 6; and FIG. 9 is a flowchart for explaining an example of the generation of a guide image and the operation of an example of a display method in FIG. 6.

DETAILED DESCRIPTION OF THE INVENTION

Figure 1:
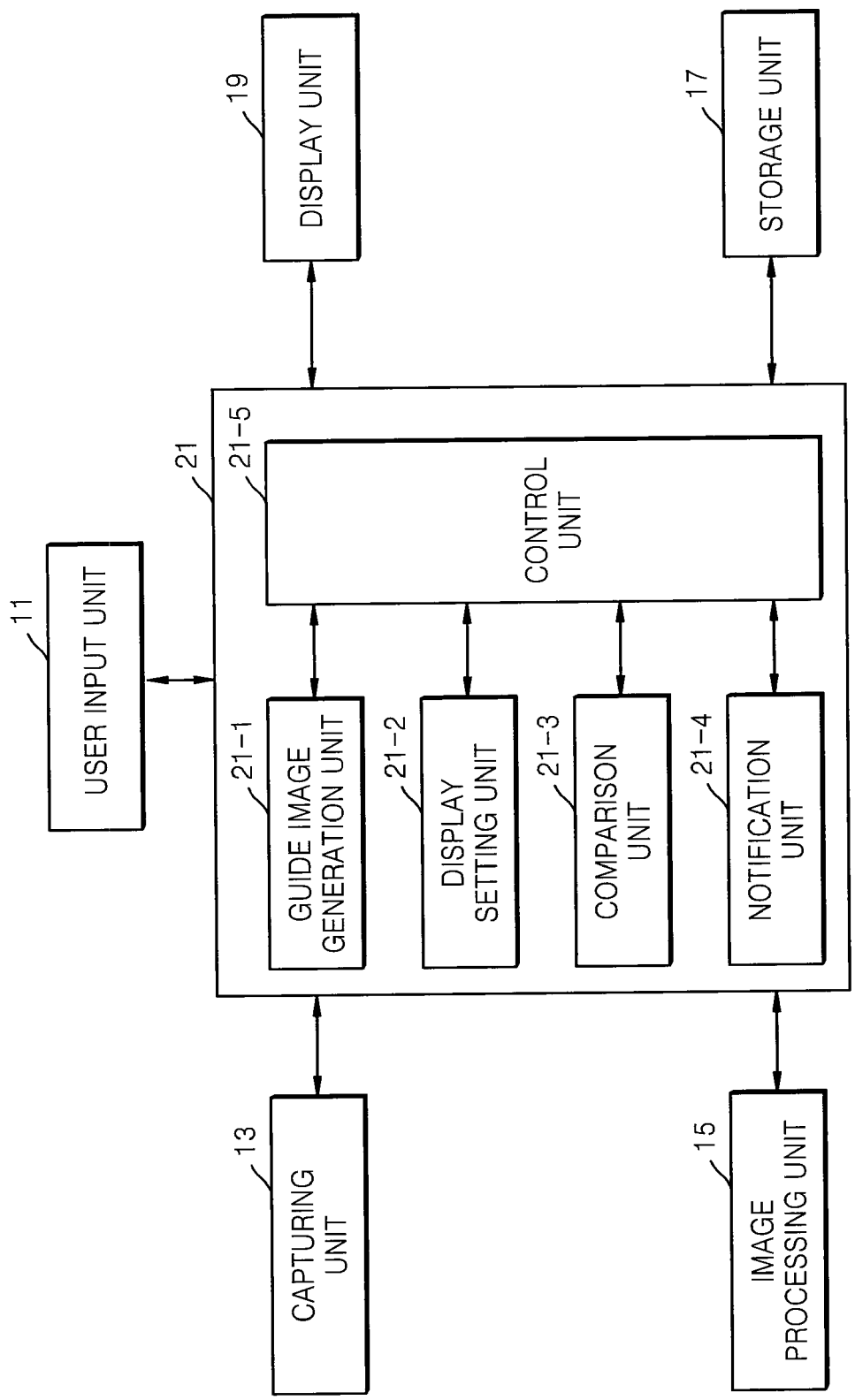
FIG. 1 is a block diagram showing the structure of an example of an image capturing apparatus.

Therefore, there is a need in the art for a digital image processing apparatus which includes a digital signal processing unit configured to display a guide image of a previously captured image in a portion of a screen and a live view image in another portion of the screen, and a notification unit configured to notify a user when the guide image and the live view image matched with each other.

The attached drawings for illustrating exemplary embodiments are referred to in order to aid in explaining the embodiments. Like reference numerals in the drawings denote like elements.

FIG. 1 is a block diagram showing the structure of an example of an image capturing apparatus. Referring to FIG. 1, an image capturing apparatus according to the present embodiment includes a user input unit 11, a capturing unit 13, an image processing unit 15, a storage unit 17, a display unit 19, and a digital signal processing unit 21. Although it is not shown in FIG. 1, the user input unit 11 may include a shutter release button to open or close a shutter to allow a charge coupled device (CCD) or film to be exposed to light for a predetermined time, a power button to supply power, a wide-zoom button and a tele-zoom button to increase or decrease a viewing angle according to an input, and a function button to execute various menus related to the operation of a digital image processing apparatus.

The capturing unit 13 includes the shutter, a lens unit, a motor unit, an iris, the CCD, and an analog to digital converter (ADC). The shutter is a mechanism to control the amount of light for exposure with the iris. The lens unit receives light from an external light source to process an image. The iris controls the amount of incident light according to a degree of the opening/closing of the iris. The degree of the opening/closing of the iris is controlled by the digital signal processing unit 21.

In an auto focus mode, a focus motor (not shown) is driven by controlling a focus lens (not shown) by the digital signal processing unit 21. Accordingly, the focus lens moves from the foremost position to the rearmost position. In the movement, the position of the focus lens where a high frequency component of an image signal is the largest, for example, the drive step number of the focus motor is set.

The CCD accumulates the amount of light input through the lens unit and outputs an image captured by the lens unit in response to a vertical sync signal according to the accumulated light amount. In the digital image processing apparatus, an image is obtained by the CCD that converts the light reflected from an object to an electric signal. A color filter is needed to obtain a color image using the CCD. A color filter array (CFA; not shown) is generally used as the color filter.

The CFA allows only light of a single color to pass for each pixel and has a regularly arranged structure. The CFA has a variety of shapes according to the structure of array. The ADC converts an analog image signal output from the CCD to a digital signal.

The image processing unit 15 performs signal processing to allow digital converted RAW data to be displayed. The image processing unit 15 removes a black level due to dark current generated in the CCD and the CFA filter that is sensitive to a change in temperature.

The image processing unit 15 performs gamma correction to encode information according to non-linearity of the sense of sight of a human. The image processing unit 15 performs CFA interpolation to interpolate a Bayer pattern embodied by an RGRG line and a GBGB line of predetermined gamma corrected data to an RGB line.

The image processing unit 15 converts the interpolated RGB signal to Y, U, and V signals, performs edge compensation to clearly process an image by filtering a Y signal by a high band filter and color correction to correct a color value of U and V signals using a standard color coordinate system, and removes noise from the Y, U, and V signals.

The image processing unit 15 generates a JPEG file by compressing and performing signal processing with respect to the Y, U, and V signals from which noise is removed. The generated JPEG file is displayed on the display unit 19 and stored in the storage unit 17. All operations of the image processing unit 15 are under the control of the digital processing unit 21.

The digital signal processing unit 21 displays a guide image that is previously captured in an edge side portion of a screen of the display unit 19, displays a live view image in the other portion of the screen, and controls capturing of an image when the guide image and the live view image are matched with each other. For this purpose, the digital signal processing unit 21 includes a guide image generation unit 21-1, a display setting unit 21-2, a comparison unit 21-3, a notification unit 21-4, and a control unit 21-5.

The guide image generation unit 21-1 generates a guide image by trimming the central portion of the previously captured reference image. The display setting unit 21-2 displays the trimmed guide image in the edge side portion of the display unit 19 and displays a live view image in the other portion outside the guide image.

Figure 2:
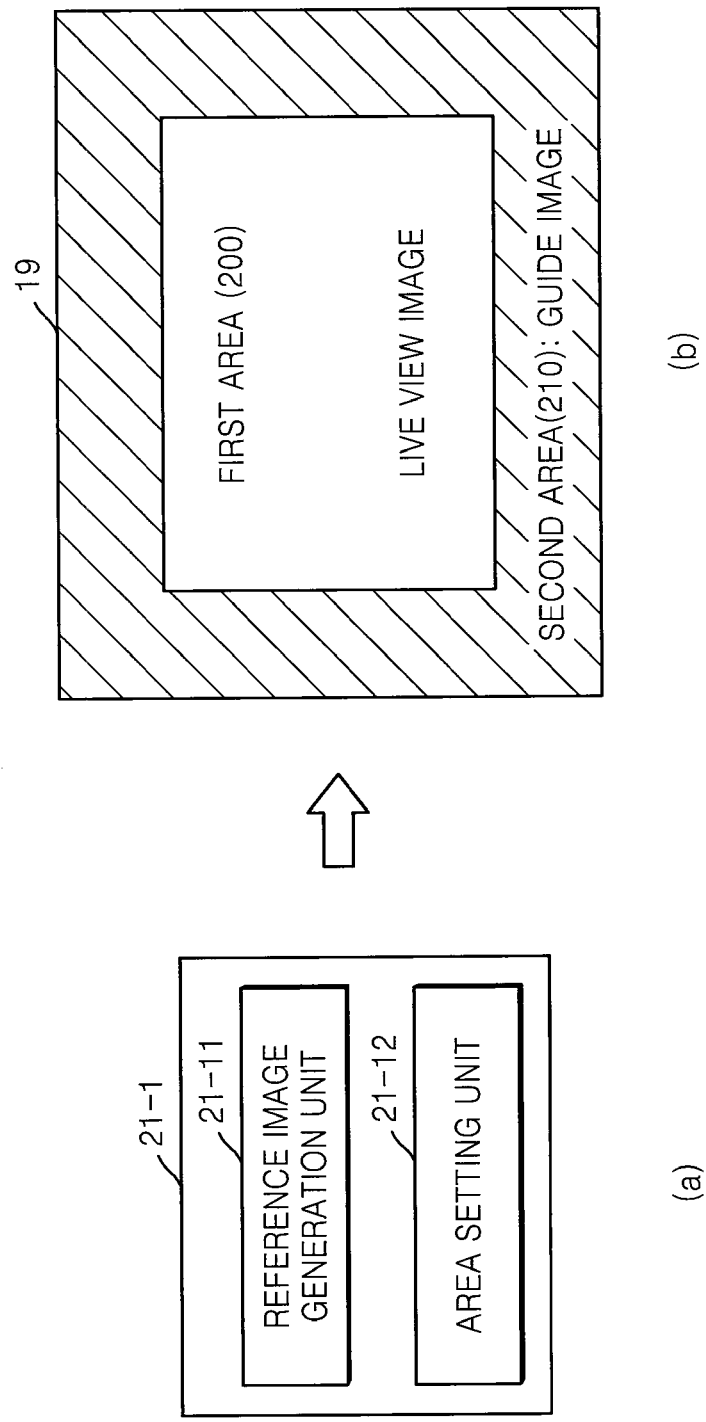
FIGS. 2A and 2B are, respectively, a block diagram of an example of a guide image generation unit of FIG. 1 and an example of a view showing a display setting according to the guide image generation unit of FIG. 2A.
Figure 3:
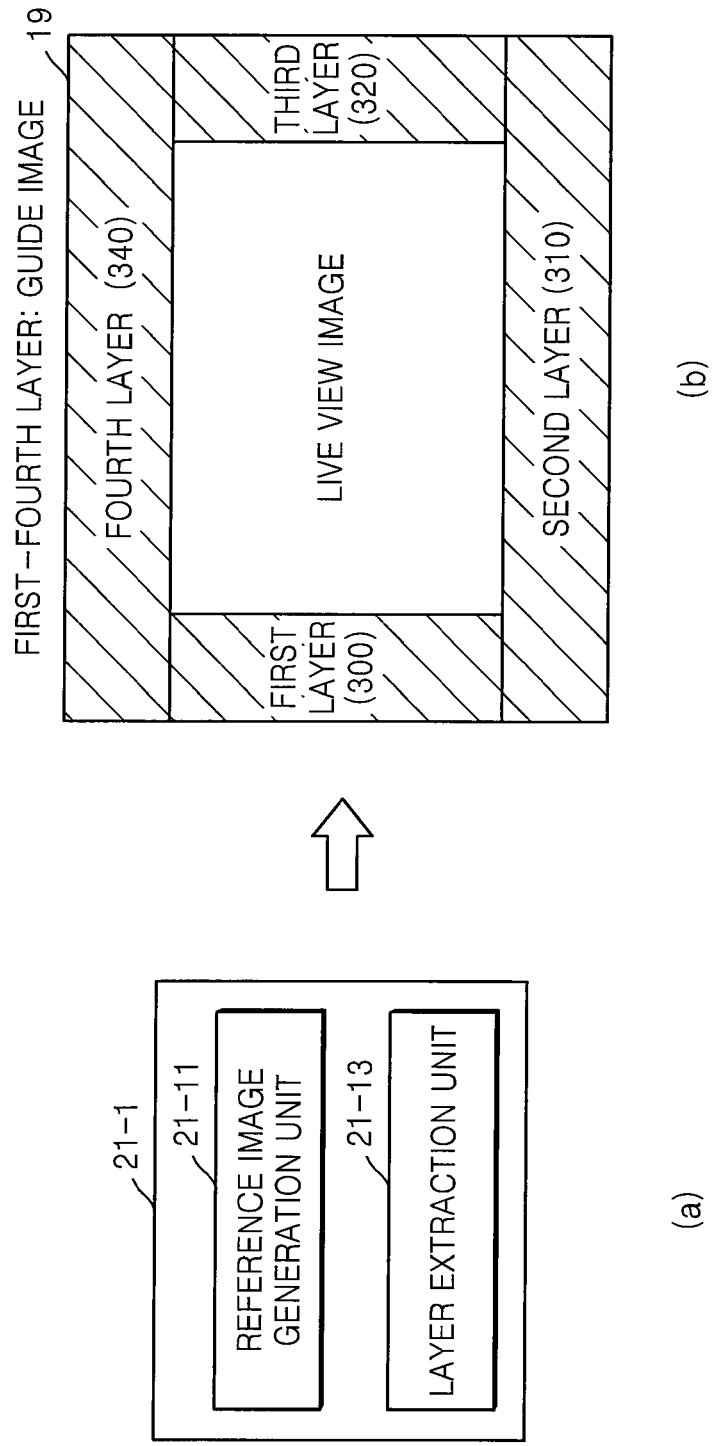
FIGS. 3A and 3B are, respectively, a block diagram of an example of a guide image generation unit of FIG. 1 and a view showing an example of a display setting according to the guide image generation unit of FIG. 3A.
Figure 4:
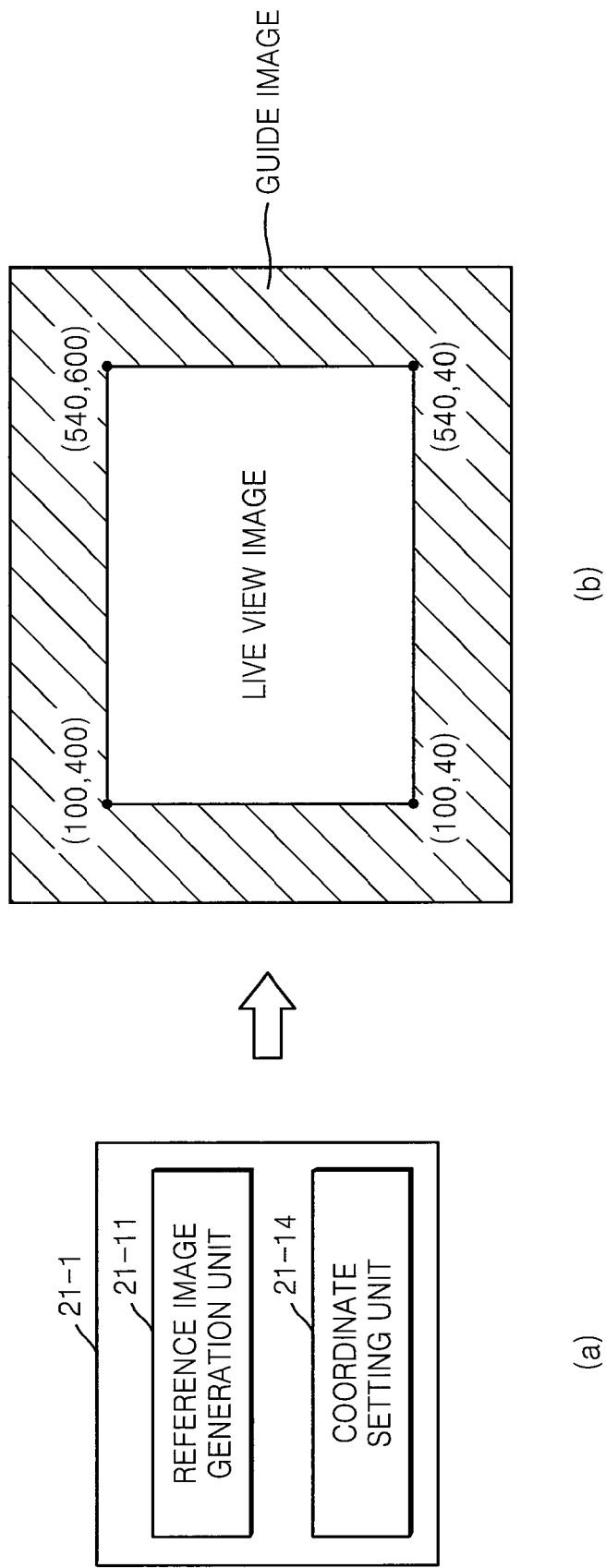
FIGS. 4A and 4B are, respectively, a block diagram of an example of a guide image generation unit of FIG. 1 and a view showing an example of a display setting according to the guide image generation unit of FIG. 4A.

FIGS. 2-4 are, respectively, block diagrams of examples of the guide image generation unit 21-1 of FIG. 1 and views showing example display settings according to the guide image generation unit 21-1. First, referring to FIG. 2A, the guide image generation unit 21-1 according to an embodiment of the present invention includes a reference image generation unit 21-11 and an area setting unit 21-12.

Figure 5:
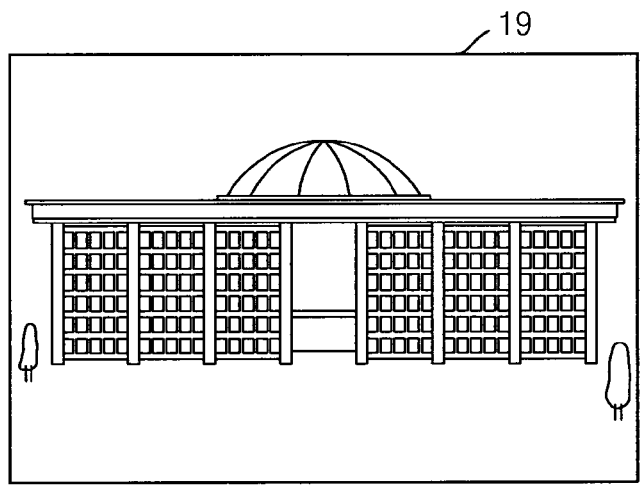
FIGS. 5A, 5B, and 5C are examples of images for explaining capturing of an image with reference to FIG. 1.
Figure 5:
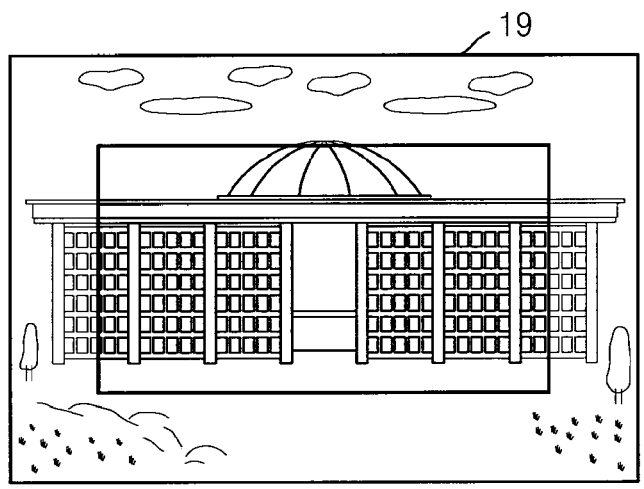
Figure 5:
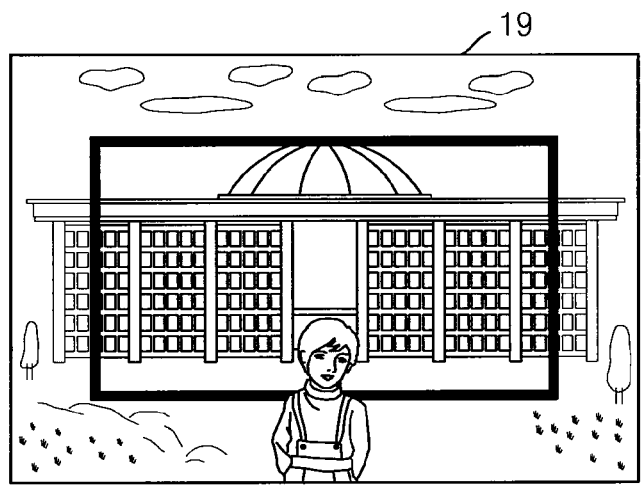

The reference image generation unit 21-11 generates an image obtained by previously capturing a background that a requester intends as a reference image for the guide image generation. FIG. 5A shows an example of the first image captured by the requester.

When a reference image is generated, the area setting unit 21-12 sets a first area 200 that is smaller than the overall area of the display unit 19 where an image is displayed and an area other than the first area 200, that is, an area obtained by deducting the first area 200 from the overall area of the display unit 19 to a second area 210, which is shown in FIG. 2B. The size of the first area 200 may be adjustable and, when the adjustment is not performed, a default value is used to determine the size of the first area 200.

When the setting of the first and second areas 200 and 210 is completed, the display setting unit 21-2 displays a live view image in the first area 200 and a guide image, that is, the reference image as large as the second area 200, in the second area 210.

Next, the guide image generation unit 21-1 according to another embodiment shown in FIG. 3A includes the reference image generation unit 21-11 and a layer extraction unit 21-13. The reference image generation unit 21-11 generates an image obtained by previously capturing a background that the requester intends as a reference image for the guide image generation. FIG. 5A shows an example of the first image captured by the requester.

When the reference image is generated, the layer extraction unit 21-13 extracts the first layer 300 through the fourth layer 340 separated a predetermined distance from the edge of the display unit 19 where an image is displayed. FIG. 3B illustrates the extracted first through fourth layers 300-340. The sizes of the first through fourth layers 300-340 may be adjustable and, when the adjustment is not performed, a default value is used to determine the sizes of the first through fourth layers 300-340.

When the extraction of the first through fourth layers 300-340 is completed, the display setting unit 21-2 displays the guide image in the first through fourth layers 300-340, that is, the reference image as much as the first through fourth layers 300-340, and displays a live view image in the other area.

The guide image generation unit 21-1 according to another embodiment shown in FIG. 4A includes the reference image generation unit 21-11 and a coordinate setting unit 21-14. The reference image generation unit 21-11 generates an image obtained by previously capturing a background that the requester intends as a reference image for the guide image generation. FIG. 5A shows an example of the first image captured by the requester.

When the reference image is generated, the coordinate setting unit 21-14 sets first through fourth coordinates defining a rectangle in the display unit 19 where an image is displayed. FIG. 4B illustrates the first through fourth coordinates. In FIG. 4B, for example, the first, second, third, and fourth coordinates are respectively set to (100, 40), (540, 40), (100, 400), and (540, 600). The positions of the first through fourth coordinates may be adjustable and, when the adjustment is not performed, a default value is used to determine the positions of the first through fourth coordinates.

When the first through fourth coordinates are completely set, the display setting unit 21-2 displays a guide image, that is, a reference image as large as a predetermined area, outside the rectangle defined by the first through fourth coordinates, and displays a live view image in the rectangle defined by the first through fourth coordinates.

FIG. 5B illustrates an example that the live view image and the guide image set by the display setting unit 21-2 are displayed. The control unit 21-5 may process the guide image to be semitransparent so that it can be distinguished from the live view image. The transparency of the guide image may be adjusted according to the surrounding environment including the intensity of light.

The comparison unit 21-3 compares the guide image fixedly displayed in the edge side portion of the display unit 19 and the live view image that changes in real time to see if the guide image and the live view image are matched with each other. The comparison unit 21-3 may determined that the guide image and live view image match based on approximating how close the two images are. The comparison unit 21-3 may indicate the two images match based on whether the framing of the of the two images is approximately the same. For example, the comparison unit 21-3 may indicate that there is a match even when people are in a guide image but not in a live image and even when people are in a live image but not in a guide image. When the guide image is generated by the reference image captured by the requester, the requester hands a digital image processing apparatus to one who is requested to capture an image. The one who is requested to capture an image changes a frame of the live view image to fit the live view image into the guide image fixedly displayed in the edge side portion of the display unit 19. In doing so, the comparison unit 21-3 compares the guide image and the live view image to see if the guide image and the live view image are matched with each other.

When the guide image and the live view image are matched with each other as a result of the comparison by the comparison unit 21-3, the notification unit 21-4 notifies the one who is requested to capture an image of such a fact. For example, as shown in FIG. 5C, the notification may be a change in the color of the edge side portion of the live view image or may be an output of an audio signal indicating that the guide image and the live view image are matched with each other.

When the notification unit 21-4 outputs a notification signal and the one who is requested to capture an image presses the shutter button, the control unit 21-5 controls capturing of the live view image. Although it is not shown in the display screen, the live view image may exist behind the guide image. The control unit 21-5 detects whether the shutter button is pressed and controls capturing of the overall live view image except for the guide image. As another example, when a predetermined time passes after the notification unit 21-4 outputs a notification signal, the control unit 21-5 controls automatic capturing of the present live view image even if the shutter button is not pressed. Thus, according to the above structure, the image intended by the requester may be easily captured by one who is requested.

A method of capturing an image according to an embodiment of the present invention will be described in detail with reference to FIGS. 6-9.

The image capturing method according to the present invention may be performed in the digital image processing apparatus as shown in FIGS. 1-4. A main algorithm of the method according to the present embodiment may be performed in the digital signal processing unit 21 with the other constituent elements of other constituent elements of the digital image processing apparatus.

In order for the one who is requested to easily capture an image that the requester intended, the digital signal processing unit 21 generates the image captured as the requester presses the shutter button, as a reference image (Operation 601). FIG. 5A illustrates an example of the first image captured by the requester.

When the reference image is generated, the digital signal processing unit 21 generates a guide image by trimming the central portion of the reference image (Operation 603). When the guide image is generated, the digital signal processing unit 21 displays the guide image in the edge side portion of the display unit 19 and a live view image in an area other than the guide image (Operation 605).

FIGS. 7-9 illustrate examples of methods of generating and displaying a guide image. Referring to FIG. 7, in an example of a method of generating and displaying a guide image, after a reference image is generated, the digital signal processing unit 21 generates the first area 200 smaller than the overall area of the display unit 19 as shown in FIG. 2B (Operation 701). The size of the first area 200 may be adjustable and, when the adjustment is not performed, a default value is used to determine the size.

The digital signal processing unit 21 generates the second area 210 by deducting the first area 200 from the overall area of the display unit 19 (Operation 703). When the generation of the first and second areas 200 and 210 are completed, the digital signal processing unit 21 displays a live view image in the first area 200 and a guide image, that is, a reference image as large as the second area 200, in the second area 210 (Operation 705).

Referring to FIG. 8, according to an embodiment, after a reference image is generated, as shown in FIG. 3B, the digital signal processing unit 21 extracts the first through fourth layers 300-340 separated a predetermined distance from the edge side portion of the display unit 19 (Operation 801). The sizes of the first through fourth layers 300-340 may be adjustable and, when the adjustment is not performed, a default value is used to determine the sizes of the first through fourth layers 300-340.

When the extraction of the first through fourth layers 300-340 is completed, the digital signal processing unit 21 displays a guide image, that is, a reference image as large as the first through fourth layers 300-340, in the first through fourth layers 300-340, and a live view image in the other area (Operation 803).

Referring to FIG. 9, according to another embodiment, after a reference image is generated, as shown in FIG. 4B, the digital signal processing unit 21 sets the first through fourth coordinates defining a rectangle in the display unit 19 (Operation 901). In FIG. 4B, for example, the first, second, third, and fourth coordinates are respectively set to (100, 40), (540, 40), (100, 400), and (540, 600). The positions of the first through fourth coordinates may be adjustable and, when the adjustment is not performed, a default value is used to determine the positions of the first through fourth coordinates.

When the setting of the first through fourth coordinates is completed, the digital signal processing unit 21 displays a guide image, that is, a reference image as large as a corresponding area, outside the rectangle defined by the first through fourth coordinates and a live view image inside the rectangle defined by the first through fourth coordinates (Operation 903).

FIG. 5B illustrates an example of displaying the live view image and the guide image set by the digital signal processing unit 21. To distinguish the guide image and the live view image, the digital signal processing unit 21 may process the guide image to be semitransparent and adjusts the transparency of the guide image according to the surrounding environment including the intensity of light (Operation 607).

The requester hands the digital image processing apparatus to the one who is requested to take an image (Operation 609). Then, the one who is requested to take an image changes the frame of the live view image to fit the live view image into the guide image fixedly displayed in the edge side portion of the display unit 19 (Operation 611).

The digital signal processing unit 21 determines whether the live view image in a change frame and the guide image fixedly displayed in the edge side portion of the display unit 19 are matched with each other (Operation 613). If the guide image and the live view image are matched with each other, the digital signal processing apparatus 21 notifies such a fact to the one who is requested (Operation 615). For example, as shown in FIG. 5C, the notification may be a change in the color of the edge side portion of the live view image or may be an output of an audio signal indicating that the guide image and the live view image are matched with each other.

After a notification signal is output, the digital signal processing unit 21 receives a shutter button input signal of the one who is requested and captures a live view image (Operation 617). Although it is not shown in the display screen, the live view image that is not shown may exist behind the guide image. The digital signal processing unit 21 detects whether the shutter button is pressed and controls capturing of the overall live view image except for the guide image.

In another example, the digital signal processing unit 21 controls automatic capturing of the present live view image, even if the shutter button is pressed, when a predetermined time passes after the notification signal is output.

As described above, since a background is previously captured and clearly displayed in an edge side portion in a live view mode, an actual image may be captured to fit into the background that is previously captured and displayed in the edge side portion. Thus, a third party may easily capture an image that a requester intends.

The various illustrative units, logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

Further, the steps and/or actions of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal. In the alternative, the processor and the storage medium may reside as discrete components in a user terminal. Additionally, in some aspects, the steps and/or actions of a method or algorithm may reside as one or any combination or set of instructions on a machine readable medium and/or computer readable medium.

While this invention has been particularly shown and described with reference to exemplary embodiments thereof, it will be understood by those skilled in the art that various changes in form and details may be made therein without departing from the spirit and scope of the invention as defined by the appended claims.

What is claimed is:

1. A digital image processing apparatus comprising:
   a digital signal processing unit configured to display a guide image in a portion of a screen and a live view image in the screen, wherein the guide image is a previously captured image and the guide image is overlaid on the live view image;
   a notification unit configured to notify a user when the guide image and the live view image match each other; and
   the digital signal processing unit configured to capture an image in direct response to the elapse of a predetermined time passing from the notification that the guide image and the live view image match each other, without receiving a signal from a shutter button from the notification to when the image is captured.

2. The apparatus of claim 1, further comprising:
   a guide image generation unit configured to generate the guide image by trimming a central portion of the previously captured image;
   a display setting unit configured to display the guide image in the portion of the screen and the live view image in the another portion of the screen different from the portion of the screen;
   a comparison unit configured to compare the guide image and the live view image to determine if the guide image and the live view image are matched with each other; and
   a control unit configured to control capturing of an image when the guide image and the live view image are matched with each other.

3. The apparatus of claim 2, wherein the control unit configured to control capturing of an image without input external to the apparatus when the guide image and the live view image are matched with each other.

4. The apparatus of claim 1, wherein the control unit adjusts transparency of the guide image based on at least one of photographing conditions and user settings.

5. A digital image processing apparatus comprising:
   a digital signal processing unit configured to display a guide image of a previously captured image in a portion of a screen and a live view image in another portion of the screen,
   wherein the digital signal processing unit is configured to capture an image in direct response to an expiration of a predetermined time passing from a time when the guide image and the live view image match each other, without receiving a signal from a shutter button from when the guide image and the live view image match each other to when the image is captured.

6. The apparatus of claim 5, wherein the guide image generation unit further comprises a first area generation unit configured to generate a first area that is smaller than an overall screen area, and a display setting unit configured to display the guide image in an area of the screen obtained by deducting the first area from the overall screen area and the live view image in the first area.

7. A digital image processing apparatus comprising:
   an area generation unit configured to generate a first area of a display smaller than an overall display area;
   a display setting unit configured to display a live view image in the first area and to display a guide image that is a previously captured image in an area of the display other than the first area;
   a notification unit configured to notify a user that the guide image and the live view image are matched with each other, when the guide image and the live view image are matched with each other; and
   a control unit configured to control capture an image in direct response to the elapse of a predetermined time passing from the notification that the guide image and the live image match each other, without receiving a signal from a shutter button from the notification to when the image is captured.

8. The apparatus of claim 7, wherein the control unit adjusts transparency of the guide image.

9. A method of operating a digital image processing apparatus, the method comprising:
   displaying a guide image on a display and trimming a central portion of the guide image;
   displaying a live view image in the display, wherein the guide image is overlaid on the live view image; and
   capturing an image in direct response to the elapse of a predetermined time passing from the notification that the guide image and the live view image match each other, without receiving a signal from a shutter button from the notification to when the image is captured.

10. The method of claim 9, further comprising notifying a user that the guide image and the live view image are matched with each other by changing the color of an edge side portion of the live view image or outputting a notification audio signal, when the guide image and the live view image are matched with each other.

11. The method of claim 9, wherein a transparency of the guide image is adjusted by a control unit.

12. The method of claim 9, wherein displaying a guide image comprises:

generating a first area smaller than an overall display area, and displaying the guide image in an area obtained by deleting the first area from the overall display area.

\* \* \* \* \*